United States Patent [19]

Nagano

[11] 4,269,601
[45] May 26, 1981

[54] REAR DERAILLEUR FOR A BICYCLE
[75] Inventor: Masashi Nagano, Sakai, Japan
[73] Assignee: Shimano Industrial Company, Limited, Osaka, Japan
[21] Appl. No.: 116,210
[22] Filed: Jan. 28, 1980
[30] Foreign Application Priority Data Feb. 15, 1979 [JP] Japan ............... 54/18629[U]

[51] Int. Cl.³ ............................................. F16H 11/04
[52] U.S. Cl. ................................. 474/82; 474/134
[58] Field of Search .......................... 474/78–83, 474/133, 134, 144, 145

[56] References Cited

U.S. PATENT DOCUMENTS

| 3,710,636 | 1/1973 | Ozaki | 474/82 |
| 4,161,124 | 7/1979 | Juy | 474/82 |
| 4,198,874 | 4/1980 | Nagano et al. | 474/82 |

FOREIGN PATENT DOCUMENTS 8974 12/1956 Fed. Rep. of Germany ............. 474/80

Primary Examiner—Lawrence J. Staab
Attorney, Agent, or Firm—Stevens, Davis, Miller & Mosher

[57] ABSTRACT

A rear derailleur for a bicycle, which comprises a base member, two linkage members and a movable member, the movable member supporting one pulley plate having a guide pulley and tension pulley. The guide and tension pulleys provide separate guard plates respectively so that a gap is formed therebetween for allowing a driving chain to pass through the gap closed by the use of a tension spring.

4 Claims, 3 Drawing Figures

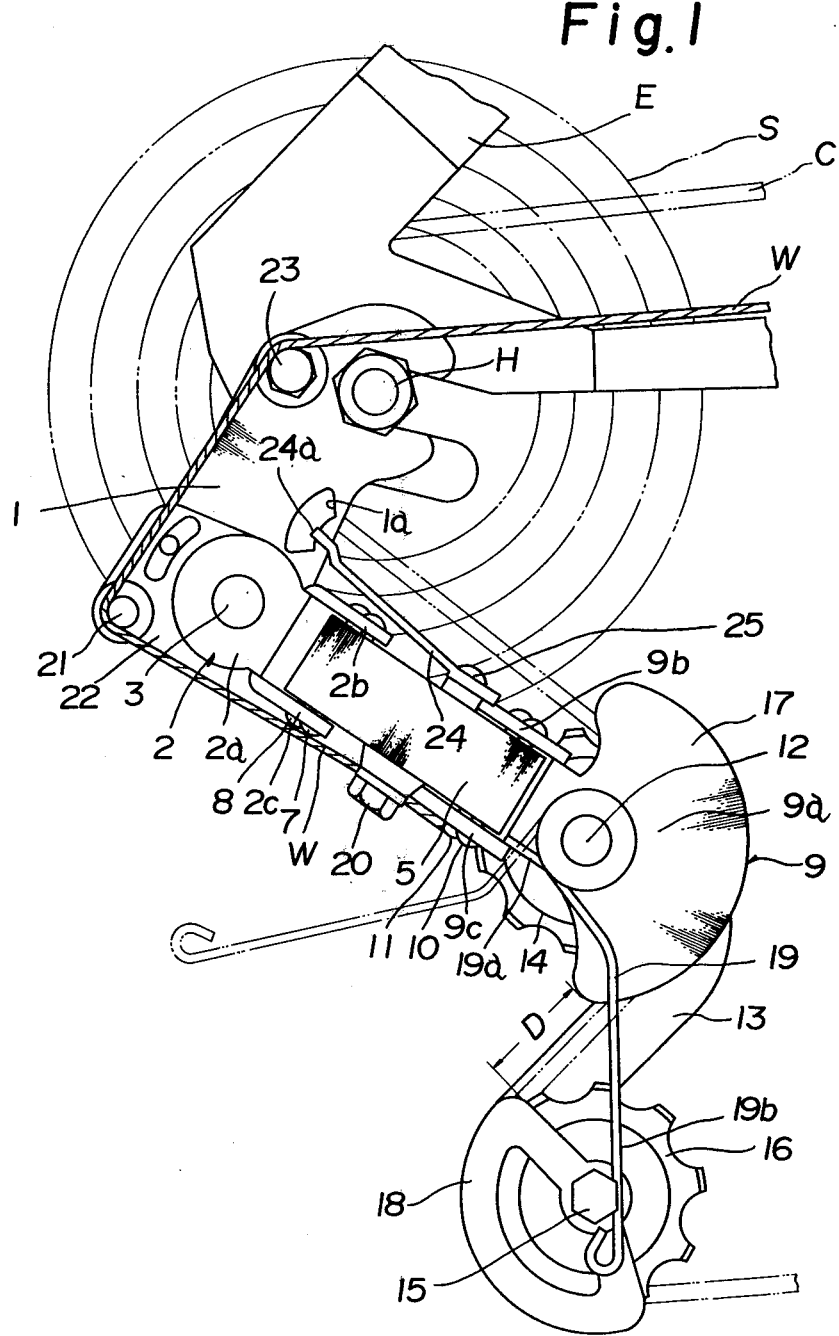

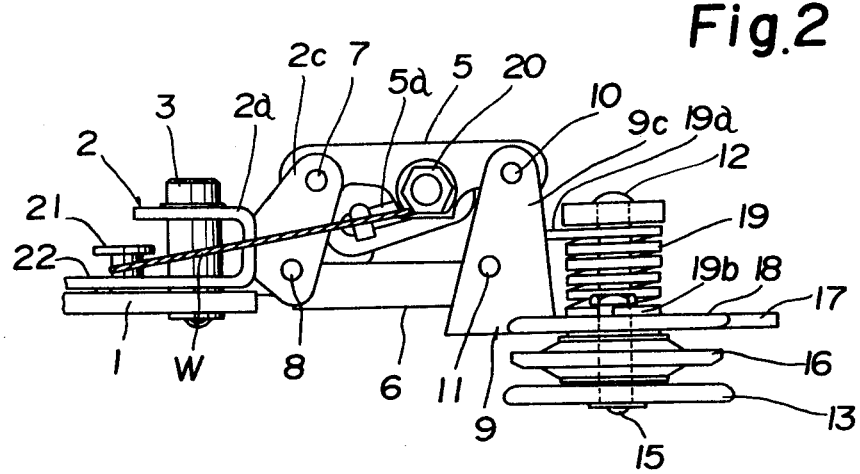
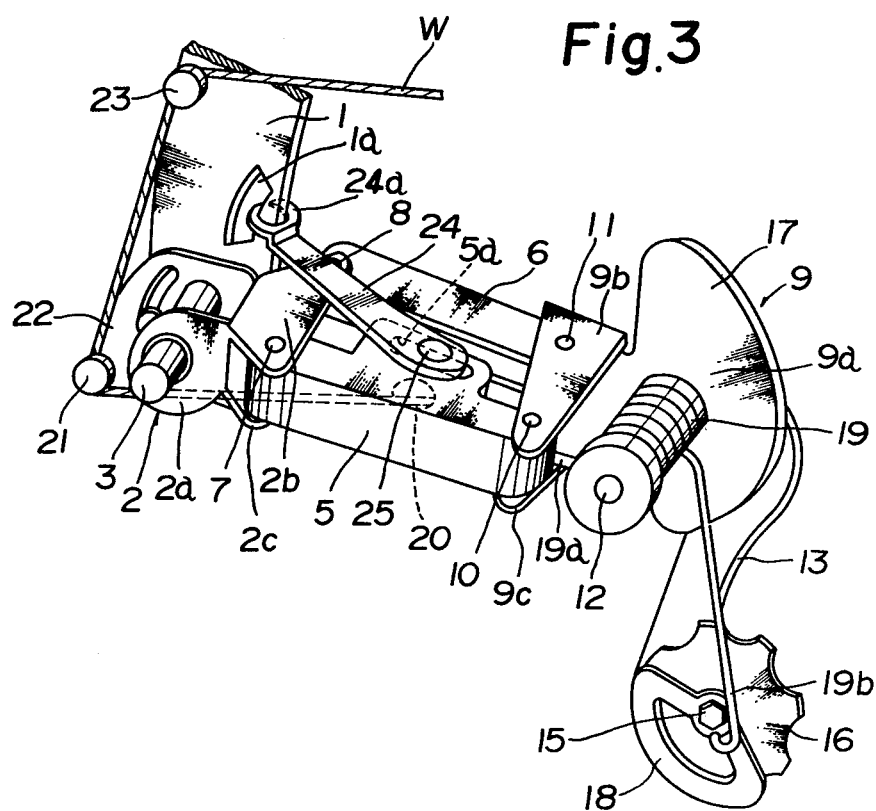

REAR DERAILLEUR FOR A BICYCLE

BACKGROUND AND SUMMARY OF THE INVENTION

This invention relates to a rear derailleur for a bicycle, and more particularly to a rear derailleur for a bicycle, which is adapted to switch a driving chain to a selected one of multi-stage sprockets for changing the bicycle speed.

This kind of derailleur has a pantograph mechanism comprising a base member supported to the bicycle frame, a pair of linkage members supported swingably to the base member, and a movable member supported to the linkage members, the movable member carrying a chain change-over cage having a guide pulley and a tension pulley.

The change-over cage of a conventional rear derailleur comprises one pulley plate supported to the movable member and one guard plate having substantially the same shape as the pulley plate, both the plates being opposite to each other and rotatably carrying the guide and tension pulleys between these plates, and the pulley plate is subjected to the force of a tension spring supported to the movable member.

When the rear derailleur is used for the bicycle, the base member is disposed axially outwardly of a rear hub carrying the multi-stage sprockets and is supported to the frame, and a driving chain stretched across a selected sprocket and crank means is, along its length, placed onto the guide and tension pulleys to travel in a Z-like manner from the tension pulley to the guide pulley, the chain being applied with a given tension by the tension spring.

A control wire is operated to transform the pantograph mechanism and move the movable member axially of the multi-stage sprockets, so that the driving chain is guided by the guide and tension pulleys and switched to a selected sprocket for changing the bicycle speed.

In the conventional derailleur constructed and used according to the foregoing, the chain guard comprises a guard portion for the chain placed on the guide pulley and that for the chain placed on the tension pulley, which guard portions are connected. In order to place the chain onto the tension and guide pulleys, the chain should be inserted through a space enclosed by the surrounding pulley, pulley plate and guard plate. Therefore, the endless chain is cut for insertion through the space.

Hence, it is very difficult to place the chain onto the pulleys which results in the problem of poor workability. The above problem can be solved by cutting the guard plate for inserting the chain therethrough. However, another problem will arise in that the chain, when in use, can disengage from the respective pulleys and escape through the cut portion.

This invention has been designed to overcome the aforesaid problems. A main object of the invention is to provide a rear derailleur for a bicycle, which is capable of simply placing the endless chain onto the pulleys and which prevents the chain from unexpectedly escaping from the pulleys. Another object of the invention is to provide a rear derailleur for a bicycle, which is simple in construction and inexpensive to manufacture because a particular member is not required for preventing escape of the chain.

This invention is characterized in that first and second guard plates are separately provided for the guide and tension pulleys, and between the first and second guard plates is formed a gap which accepts insertion of the chain therethrough, and the gap being closed by use of a tension spring.

In greater detail, a tension spring having first and second ends of connection is carried onto a pivot shaft through which the pulley plate is supported to the movable member. The first end of the tension spring is retained by the moveble member and the second end extends to a shaft of the tension pulley along the outer surfaces of first and second guard plates and is retained by the pulley shaft in the vicinity of the axial end thereof to thereby close the aforeseaid gap.

Consequently, the second end of the tension spring is released from the pulley shaft to open the gap, whereby the chain, being endless, can be placed onto the pulleys through the opening gap. After the chain is placed onto the pulleys, the second end of the tension spring is reconnected to the pulley shaft and closes the gap to thereby ensure that the chain is prevented from unexpectedly escaping from the respective pulleys.

These and other objects and novel features of the invention will be more apparent by the following description of an embodiment thereof in accordance with the accompanying drawings.

BRIEF DESCRIPTION OF THE DRAWINGS

FIG. 1 is a front view of an embodiment of a rear derailleur of the invention,

FIG. 2 is a bottom view thereof, and

FIG. 3 is a perspective view of the principal portion.

DETAILED DESCRIPTION OF THE INVENTION

Referring to the drawings, reference numeral 1 designates a bracket member fixed to a fork end E of the bicycle frame. The bracket member 1 has the utmost end of a pawl-like shape and is fixed together with a hub shaft H to the fork end E.

Reference numeral 2 designates a base member which comprises a main body 2a formed of a U-like shaped metallic plate and two support tongues 2b and 2c extending from the main body 2a and which is supported to the bracket member 1 swingably in a given range through a horizontal shaft 3.

Reference numerals 5 and 6 designate linkage members supported swingably to the tongues 2b and 2c through shafts 7 and 8 perpendicular to the horizontal shaft 3. Reference numeral 9 designates a movable member supported swingably to the foremost ends of linkage members 5 and 6 through shafts 10 and 11 parallel to the perpendicular shafts 7 and 8. The movable member 9 comprises a body 9a of a plate-like shape and two supports 9b and 9c. The foremost ends of linkage members 5 and 6 are inserted between the supports 9b and 9c and pivoted thereto through the perpendicular shafts 10 and 11. The plate-like shaped body 9a carries a pulley plate 13 swingably through a pivot shaft 12 parallel to the horizontal shaft 3.

The pulley plate 13 is elongated and supported at its one lengthwise end side to the plate-like shaped body 9a at the movable member 9 through the pivot shaft 12, and is opposite to the body 9a and spaced therefrom at a given interval. At the one lengthwise end side opposite to the body 9a is supported a guide pulley 14 through a pulley shaft. At the other lengthwise end side of the pulley plate 13 is carried a tension pulley 16 through a pulley shaft 15.

The aforesaid pulley shaft carrying the guide pulley 14, as shown in the drawings, is formed mainly of an extension of the pivot shaft 12. Alternatively, the pulley shaft may be separate from the pivot shaft 12.

At one axial side of the respective pulleys 14 and 16 and at the side reverse to the pulley plate 13 are provided a first guard plate 17 and a second guard plate 18 opposite to the pulley plate 13 respectively. The guard plates 17 and 18 are separate from each other and form therebetween a gap D through which a driving chain C is passable. The first guard plate 17 opposite to the guide pulley 14 is formed of an extension from the plate-like shaped body 9a at the movable member 9. The second guard plate 18 opposite to the tension pulley 16 is fixed to one axial end of the pulley shaft 15. In addition, the first guard plate 17 is preferred to be integral with the body 9a as shown, but may be separate therefrom so as to be fixed to the pivot shaft 12 serving as the pulley shaft.

A tension spring 19 is wound onto the pivot shaft 12 so as to bias the pulley plate 13 around the pivot shaft. The tension spring 19 is formed of a coiled spring wire and has first and second ends 19a and 19b. The first end of 19a is retained to the movable member 9. The second end of 19b extends along the outer surfaces of the first and second guard plates 17 and 18 to reach the pulley shaft 15 for the tension pulley 16 and is detachably retained to the pulley shaft 15 near the axial end thereof, preferably to the axial end, thereby closing the gap D.

In the aforesaid construction, the base member 2, two linkage members 5 and 6, and movable member 9, constitute a pantograph mechanism. Among these four members, one of the linkage members 5 and 6 and movable member 9 are provided with a wire holder 20 for holding a terminal of a control wire W. A wire guide 21 for guiding the control wire W is provided at the rear side of the base member 2 in the direction of its swinging radially of the multi-stage sprockets S, in other words, in the direction of moving the pulleys 14 and 16 apart from the bracket member 1. The wire W is pulled to transform the pantograph mechanism to thereby shift the pulleys 14 and 16 axially of the sprockets S and swing the pantograph mechanism around the horizontal pivot shaft 3, thereby shifting the pulleys 14 and 16 radially outwardly of the sprockets S.

Referring to FIGS. 1 and 2, the wire holder 20 is provided at the linkage member 5 and a first wire guide 21 is provided at an extension 22 from the base member 2 and a second wire guide 23 at the bracket member 1.

The derailleur shown in FIGS. 1 and 2 provides no return spring. Alternatively, a brace 24, as shown in FIGS. 1 and 3, is supported to the linkage member 5 through a slot 5a and a pin 25, the brace 24 having at its tip a hook 24a and being engaged therethrough with a bore 1a at the bracket member 1.

The driving chain C is placed onto the pulleys 14 and 16 at the aforesaid derailleur in such a manner that the second end 19b of tension spring 19 is first pushed forward (rightward in FIG. 1) and released from the pulley shaft 15 and then turned rearward (leftward in FIG. 1) as shown by the phantom line in FIG. 1 to thereby open the gap D between the guard plates 17 and 18. Thereafter, the chain C being endless, is inserted through the gap D and placed onto the outer periphery at the front side of guide pulley 14 and onto the outer periphery at the rear side of tension pulley 16, thereby being stretched in a Z-like manner.

After the chain is placed onto the pulleys 14 and 16, the second end 19b of tension spring 19 is again retained to the horizontal shaft 15 as shown by the solid line in FIG. 1 to thereby close the gap D, whereby the chain C can be prevented from escaping from the respective pulleys through the gap D.

The aforesaid embodiment of the invention provides the wire guides 21 and 23 at the base member 2 and bracket member 1 so that the control wire W only is guided by the wire guides and operates the movable member 9. Alternatively, the invention may be applicable to a derailleur employing an outer sheath as well as the control wire.

As is clearly understood from the aforesaid description, the guard plates are independently mounted to the respective pulleys at one axial side thereof to thereby form the gap through which the chain is passed. Hence, the chain can, being endless, be placed onto the pulleys by being inserted through the gap, thus avoiding cutting of the chain. As a result, the chain can be placed onto the pulleys rapidly and easily.

Furthermore, the tension spring extends at its second end to the pulley shaft of the tension pulley and is retained thereby in the vicinity of its axial end, so that the tension spring may close the gap to ensure that the chain is prevented from disengaging from the respective pulleys and escaping through the gap.

Also, the tension spring is used to avoid a particular construction for preventing escape of the chain, resulting in a simple derailleur inexpensive to manufacture.

While an embodiment of the invention has been shown and described, the invention is not limited to the specific construction thereof, which is merely exemplified in the specification rather than defined.

What is claimed is:

1. A rear derailleur for a bicycle, which switches a driving chain to a selected one of multi-stage sprockets of the bicycle for changing speed, said derailleur comprising:
   (a) a base member supported to a frame at the bicycle,
   (b) a pair of linkage members pivoted swingably to said base member,
   (c) a movable member supported to said pair of linkage members and moving with respect to said base member through a swinging motion of each of said linkage members,
   (d) a pulley plate supported swingably to said movable member through a pivot shaft, said pulley plate being elongated and being supported at its one lengthwise end side with respect to said movable member and spaced therefrom at a given interval,
   (e) a guide pulley and a tension pulley which are supported rotatably to said pulley plate through pulley shafts respectively, said guide pulley being supported at one lengthwise end side of said pulley plate, said tension pulley being supported at the other lengthwise end side of said pulley plate,
   (f) a first guard plate being mounted to said guide pulley at its one axial side thereof and at the opposite side to said pulley plate and being disposed opposite thereto,
   (g) a second guard plate being mounted to said tension pulley at one axial side thereof and at the opposite side to said pulley plate and being disposed opposite thereto, said second guard plate being separate from said first guard plate, so that both said first and second guard plates have therebetween a gap through which said driving chain is allowed to pass, and (h) a tension spring supported to said pivot shaft, said tension spring having first and second ends, said first end being retained by said movable member, said second end extending along the outer surfaces of said first and second guard plates to the pulley shaft of said tension pulley and being retained by said pulley shaft near an axial end thereof in engageable and disengageable relationship with said pulley shaft, thereby closing said gap.

2. A rear derailleur for a bicycle according to claim 1, wherein said tension spring is formed of a spring wire and has a control knob at said second end.

3. A rear derailleur for a bicycle according to claim 1, wherein said first guard plate is formed integrally with said movable member.

4. A rear derailleur for a bicycle according to claims 1 and 3, wherein said pulley shaft carrying said guide pulley is formed integrally with said pivot shaft.

* * * * *